US008916739B2

(12) United States Patent
Fichtl et al.

(10) Patent No.: US 8,916,739 B2
(45) Date of Patent: Dec. 23, 2014

(54) METHODS AND APPARATUSES FOR PREPARING NORMAL PARAFFINS AND HYDROCARBON PRODUCT STREAMS

(71) Applicant: UOP LLC, Des Plaines, IL (US)

(72) Inventors: Geoffrey William Fichtl, Chicago, IL (US); Daniel Ellig, Arlington Heights, IL (US); Stanley Joseph Frey, Palatine, IL (US); Michael J. McCall, Geneva, IL (US); Andrea G. Bozzano, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 209 days.

(21) Appl. No.: 13/712,181

(22) Filed: Dec. 12, 2012

(65) Prior Publication Data
US 2014/0163278 A1 Jun. 12, 2014

(51) Int. Cl.
C07C 1/207 (2006.01)
C07C 2/66 (2006.01)
C10G 3/00 (2006.01)
C10G 45/58 (2006.01)
C10G 9/00 (2006.01)

(52) U.S. Cl.
CPC *C10G 3/50* (2013.01); *C10G 45/58* (2013.01); *C10G 9/00* (2013.01)
USPC ............ 585/733; 585/455; 585/323; 585/319

(58) Field of Classification Search
USPC .................................. 585/323, 319, 733, 455
See application file for complete search history.

(56) References Cited

U.S. PATENT DOCUMENTS

| 7,514,590 | B1 | 4/2009 | Rice |
| 8,003,836 | B2 | 8/2011 | Marker et al. |
| 8,053,615 | B2 | 11/2011 | Cortright et al. |
| 8,236,999 | B2 | 8/2012 | Parimi et al. |
| 8,507,701 | B2 | 8/2013 | Yalamanchili et al. |
| 2008/0281115 | A1 | 11/2008 | Wang et al. |
| 2009/0229173 | A1 | 9/2009 | Gosling |
| 2010/0076233 | A1 | 3/2010 | Cortright et al. |

OTHER PUBLICATIONS

Shuangfei, "Epoxidation of Unsaturated Fatty Acid Methyl Esters in the Presence of SO3H-functional Bronsted Acidic Ionic Liquid as Catalyst", Chinese Journal of Chemical Engineering, 2011, vol. 19, No. 1, pp. 57-63.
Bacha et al., "Diesel Fuels Technical Review", Chevron Corporation, 2007.

*Primary Examiner* — Thuan D Dang
(74) *Attorney, Agent, or Firm* — Maryann Maas

(57) ABSTRACT

Methods and apparatuses for preparing normal paraffins and hydrocarbon product streams are provided herein. A method of preparing normal paraffins includes providing an unsaturated feed that includes an unsaturated compound that has at least one alkenyl group. The unsaturated feed is epoxidized to convert the at least one alkenyl group in the unsaturated compound to an epoxide functional group, thereby converting the unsaturated compound to an epoxide compound that has at least one epoxide functional group. The at least one epoxide functional group in the epoxide compound is converted to at least one secondary hydroxyl functional group, thereby converting the epoxide compound to a hydroxyl-functional compound that has at least one hydroxyl functional group. The hydroxyl-functional compound is deoxygenated to form normal paraffins.

18 Claims, 1 Drawing Sheet

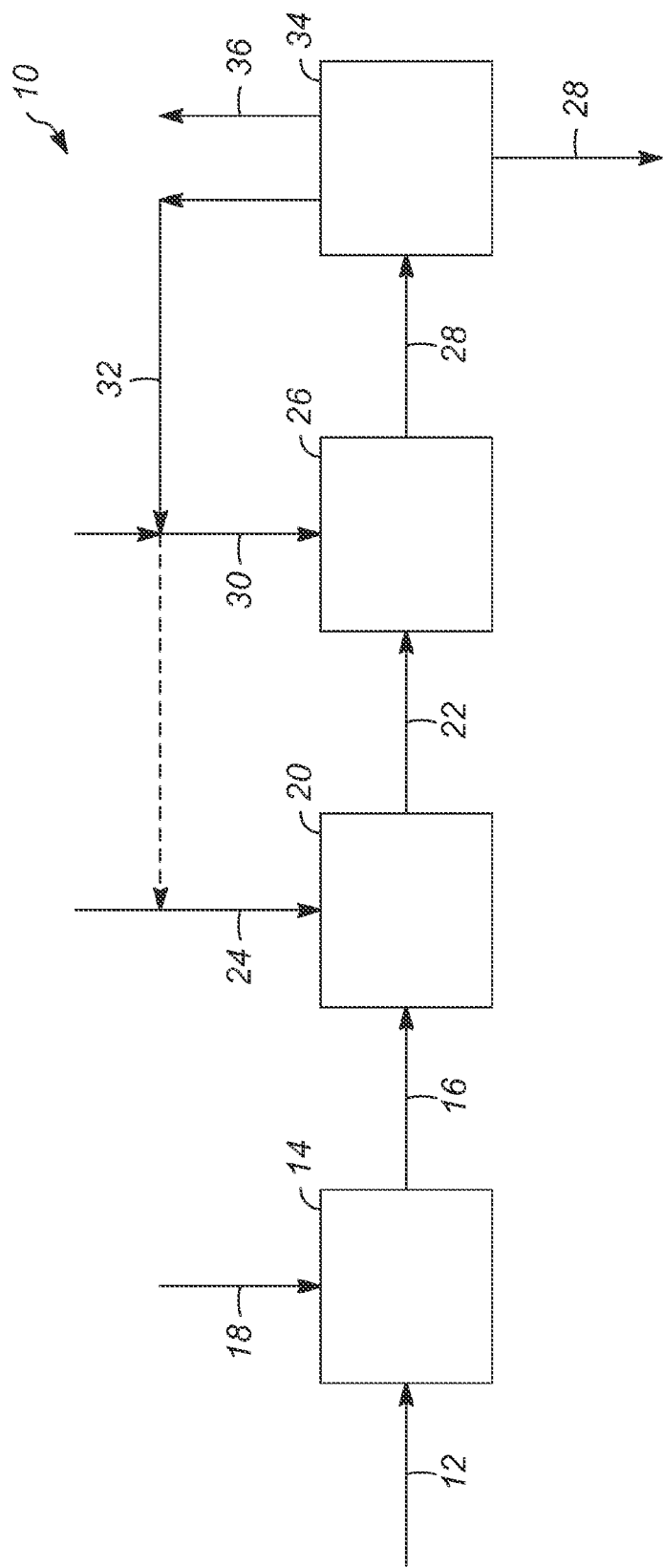

METHODS AND APPARATUSES FOR PREPARING NORMAL PARAFFINS AND HYDROCARBON PRODUCT STREAMS

TECHNICAL FIELD

The technical field relates to methods of preparing normal paraffins, methods of preparing a hydrocarbon product stream using the normal paraffins, and apparatuses for preparing normal paraffins. More particularly, the technical field relates to methods of preparing normal paraffins from an unsaturated feed that includes an unsaturated compound, methods of preparing a hydrocarbon product stream using the normal paraffins, and apparatuses for preparing the normal paraffins.

BACKGROUND

Normal paraffins have a multitude of uses, both as end products and as reactants for downstream processes. Carbon chain length of the normal paraffins varies depending upon an intended end use, with carbon chain length controlling various properties of the normal paraffins. For example, normal paraffins range from methane, which is in the gaseous phase under atmospheric and ambient conditions, to solid wax forms (such as C20 to C40 paraffins), as well as forms having even higher carbon chain lengths. Normal paraffins are also useful components within various forms of fuel, with different normal paraffins present in different types of fuel. For example, diesel fuel generally has C9 to C22 paraffins, and many diesel fuels have high amounts of C17 and C18 normal paraffins. On the other hand, jet fuel generally has a content of C9 to C16 normal paraffins, with a content of C17 and C18 normal paraffins desirably minimized in the jet fuel.

Methods of preparing normal paraffins from an unsaturated feed are generally known in the art. Normal paraffins occur naturally, in petroleum deposits among other sources, and various techniques exist for separating the normal paraffins from other compounds in the naturally-occurring sources. Normal paraffins can also be prepared through various techniques by which hydrocarbons or other carbon-containing compounds are processed to saturate olefin bonds and/or remove heterogeneous atoms (such as oxygen, nitrogen, sulfur, or other elements that are commonly present in carbon-containing compounds). With a desire to obtain hydrocarbons from renewable sources, such as vegetable and animal oils, techniques for preparing normal paraffins from naturally-occurring triglycerides and free fatty acids have become a focus in industry. One example of an existing technique involves hydrogenation of carbon-carbon double bonds in the vegetable and animal oils and deoxygenation in the presence of additional hydrogen and a deoxygenation catalyst to produce normal paraffins. Such techniques enable deoxygenation of compounds in the vegetable and animal oils to produce normal paraffins and other hydrocarbons. However, the hydrogenation/deoxygenation processes generally yield normal paraffins that boil in the diesel range, depending upon the particular type of vegetable or animal oil. For example, hydrogenation/deoxygenation of soybean oil generally yields propane as well as C17 and C18 normal paraffins, and with smaller amounts of C15 and C16 normal paraffins also produced. For certain applications, such as for renewable jet fuel and for production of linear alkyl benzene, there is a desire to obtain a hydrocarbon stream that primarily includes C9 to C15 normal paraffins. To convert the C17 and C18 normal paraffins into paraffins in the C9 to C15 paraffins range, an additional cracking process is generally required under severe conditions that promote both desired cracking/isomerization and undesired over-cracking reactions. Namely, while cracking serves to convert a portion of the C17 and C18 normal paraffins to C9 to C15 normal paraffins, low-octane naphtha (e.g., C4 to C8 normal paraffins) is also produced in appreciable quantities, thereby degrading the potential yield of the desired C9 to C15 normal paraffins.

Accordingly, it is desirable to provide novel methods of preparing normal paraffins, as well as methods of preparing hydrocarbon product streams from the normal paraffins and apparatuses for preparing the normal paraffins. There is also a desire to provide novel methods and apparatuses that enable appreciable amounts of C9 to C15 normal paraffins to be obtained from renewable feedstock, such as vegetable and animal oil, while avoiding severe cracking conditions that produce excessive amounts of C4 to C8 normal paraffins. Furthermore, other desirable features and characteristics of the present invention will become apparent from the subsequent detailed description of the invention and the appended claims, taken in conjunction with the accompanying drawings and this background of the invention.

BRIEF SUMMARY

Methods and apparatuses for preparing normal paraffins and hydrocarbon product streams are provided herein. In an embodiment, a method of preparing normal paraffins includes providing an unsaturated feed that includes an unsaturated compound that has at least one alkenyl group. The unsaturated feed is epoxidized to convert the at least one alkenyl group in the unsaturated compound to an epoxide functional group, thereby converting the unsaturated compound to an epoxide compound that has at least one epoxide functional group. The at least one epoxide functional group in the epoxide compound is converted to at least one secondary hydroxyl functional group, thereby converting the epoxide compound to a hydroxyl-functional compound that has at least one hydroxyl functional group. The hydroxyl-functional compound is deoxygenated to form normal paraffins.

In another embodiment, a method of preparing a hydrocarbon product stream includes providing an unsaturated feed that includes an unsaturated compound that has at least one carbonyl functional group and at least one alkenyl group. The unsaturated feed is epoxidized to convert the at least one alkenyl group in the unsaturated compound to an epoxide functional group, thereby converting the unsaturated compound to an epoxide compound that has at least one carbonyl functional group and at least one epoxide functional group. The at least one epoxide functional group in the epoxide compound is converted to at least one secondary hydroxyl functional group, thereby converting the epoxide compound to a hydroxyl-functional compound that has at least one carbonyl functional group and at least one hydroxyl functional group. The hydroxyl-functional compound is deoxygenated to form normal paraffins. The normal paraffins and a reactant compound are provided to a synthesis process to produce the hydrocarbon product stream that includes a product that is derived from the normal paraffins and the reactant compound.

In another embodiment, an apparatus for preparing normal paraffins is provided. The apparatus includes an epoxidation stage for receiving an unsaturated feed that includes an unsaturated compound that has at least one alkenyl group. The epoxidation stage epoxidizes the unsaturated feed to convert the at least one alkenyl group in the unsaturated compound to an epoxide functional group, thereby converting the unsaturated compound to an epoxide compound that has at least one epoxide functional group. The apparatus further includes a ring-opening stage that is in fluid communication with the epoxidation stage for receiving the epoxide compound. The ring-opening stage converts the at least one epoxide functional group in the epoxide compound to at least one secondary hydroxyl functional group, thereby converting the epoxide compound to a hydroxyl-functional compound that has at least one hydroxyl functional group. The apparatus further includes a deoxygenation stage that is in fluid communication with the ring-opening stage for receiving the hydroxyl-functional compound from the ring-opening stage. The deoxygenation stage deoxygenates the hydroxyl-functional compound to form the normal paraffins.

BRIEF DESCRIPTION OF THE DRAWINGS

The present invention will hereinafter be described in conjunction with the following drawing figures, wherein like numerals denote like elements, and wherein:

FIG. 1 is a schematic diagram of an apparatus and a method for preparing normal paraffins in accordance with an exemplary embodiment

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Methods of preparing normal paraffins, methods of preparing hydrocarbon product streams using normal paraffins, and apparatuses for preparing normal paraffins are provided herein. The methods and apparatuses employ epoxidation of an unsaturated feed that includes an unsaturated compound having at least one alkenyl group to convert the at least one alkenyl group to an epoxide group, followed by conversion of the epoxide group to at least one secondary hydroxyl group. In this manner, the unsaturated compound having at least one alkenyl group is converted to a structure similar to that of ricinoleic acid, which was discovered by the inventors to yield a range of normal paraffins upon deoxygenation. However, ricinoleic acid is not widely available in large commercial quantities, unlike many free fatty acids or triglycerides, thus rendering it difficult to directly employ ricinoleic acid (or castor oil including the ricinoleic acid) in commercial-scale deoxygenation processes for preparing normal paraffin. Without being bound to any particular theory, it is believed that the presence of the at least one secondary hydroxyl group in fatty chains of both the ricinoleic acid and the compounds prepared through epoxidation and epoxide conversion to at least one secondary hydroxyl group, as described herein, is responsible for an unexpected normal paraffin yield profile that is obtained after deoxygenation. The unexpected normal paraffin yield profile exhibits a wider yield profile of normal paraffin content as compared to conventional processing techniques that involve hydrogenation of unsaturated feed that includes the unsaturated compound having at least one alkenyl group, followed by deoxygenation. By yielding a range of normal paraffins, instead of normal paraffins that are primarily only in the diesel boiling range, severe cracking conditions can be avoided that would ordinarily be required to break down sufficient amounts of normal paraffins in the diesel boiling range (particularly those having from about 16 to about 24 carbon atoms) to normal paraffins in a sub-diesel boiling range (such as those having from about 9 to about 15 carbon atoms). In fact, in accordance with the methods described herein, cracking or isomerization can be rendered optional while still enabling a content of normal paraffins having from about 9 to about 15 carbon atoms, such as from about 10 to about 13 carbon atoms, to be obtained. As a result, less severe cracking conditions, as described in further detail below, may optionally be employed to effectively produce a hydrocarbon product stream that can be employed as renewable jet fuel while minimizing production of low-octane naphtha (e.g., C4 to C8 normal paraffins) that occurs under more severe cracking conditions. Alternatively, the normal paraffins having from about 10 to about 13 carbon atoms that result from epoxidation followed by deoxygenation can be used as feed paraffins for linear alkyl benzene production.

In an embodiment, and as shown in FIG. 1, an unsaturated feed 12 is provided in anticipation of epoxidizing the unsaturated feed 12 in an epoxidation stage 14 of an apparatus 10 for preparing normal paraffins. The unsaturated feed 12 includes an unsaturated compound that has at least one alkenyl group. The at least one alkenyl group is present to provide a site within the unsaturated compound for epoxidation, and it is believed that any unsaturated compound that has at least one alkenyl group may be epoxidized in accordance with the methods described herein. In an embodiment, suitable unsaturated compounds include those that can produce normal paraffins that have at least 9 carbon atoms after deoxygenation. For example, in embodiments, suitable unsaturated compounds include unsaturated hydrocarbons that have at least 10 carbon atoms, with the at least one alkenyl group appropriately disposed to provide for chain breakage upon epoxidation/deoxygenation to form a normal paraffin that has at least 9 carbon atoms. However, it is to be appreciated that the unsaturated compound is not limited and can include any compound that has at least one alkenyl group. In an embodiment, the unsaturated compounds also include at least one carbonyl functional group. Without being bound to any particular theory, it is believed that the presence of the carbonyl functional group impacts the normal paraffin yield profile that results from deoxygenation. It is to be appreciated that the unsaturated feed 12 may include a plurality of different unsaturated compounds that contain at least one alkenyl group. It is also to be appreciated that the unsaturated feed 12 may include additional compounds such as aromatics or compounds that are free of unsaturation, such as but not limited to normal paraffins, saturated compounds that contain carbonyl functionality, and other saturated carbon-containing compounds that contain one or more heteroatoms such as oxygen, nitrogen, sulfur.

In an embodiment, the unsaturated compound is a free fatty acid (which has a carboxylic acid group as the carbonyl group) and at least one fatty chain, with the at least one fatty chain having at least one alkenyl group. In particular, the unsaturated compound has at least one free acid group and at least one fatty chain (i.e., a carbon chain). In an embodiment, the at least one fatty chain includes a single alkenyl group, which may provide benefits vis-a-vis controlling a location of epoxide formation. However, it is to be appreciated that the at least one fatty chain can include multiple alkenyl groups, and techniques are available for controlling location of epoxide formation under such circumstances. In an embodiment, the at least one fatty chain has at least 14 carbon atoms contained therein, such as from about 14 to about 22 carbon atoms, or such as about 18 carbon atoms. Further, in this embodiment, the unsaturated compound is free from alpha- or beta-carbon-containing alkenyl groups in relation to the at least one carbonyl functional group, meaning that the alkenyl group is separated from the carbonyl group by at least two carbon atoms, which avoids material impact from the carbonyl group on subsequent epoxide formation at the alkenyl group. Further, in an embodiment, the at least one alkenyl group contains divalent carbon atoms, i.e., the fatty chains are free from terminal alkenyl groups. In an embodiment, the free fatty acid is free from branching in the fatty chain. Examples of suitable free fatty acids include, but are not limited to, myristoleic acid, palmitoleic acid, sapienic acid, oleic acid, elaidic acid, vaccenic acid, linoleic acid, linoelaidic acid, linolenic acid, arachidonic acid, eicosapentaenoic acid, erucic acid, docosahexaenoic acid, and combinations thereof Optionally, partial hydrogenation or double bond isomerization may be employed for some of the free fatty acids to modify the structure into a form that has only a single alkenyl group at a desired position in each fatty chain, such as when the free fatty acids include multiple carbon-carbon double bonds the fatty chains. In another embodiment, the unsaturated compound is a triglyceride that has three fatty chains, with each of the fatty chains bonded through an ester linkage as the carbonyl group. The fatty chains may each include a single alkenyl group, although it is to be appreciated that the at least one fatty chain can include multiple alkenyl groups as described above in the context of the free fatty acids. Like with the free fatty acids, partial hydrogenation or double bond isomerization may be employed for some of the triglycerides to modify the structure into a form that has only a single alkenyl group at a desired position in each fatty chain. As with the free fatty acids above, in an embodiment, the triglycerides are free from alpha- or beta-carbon-containing alkenyl groups in relation to ester linkages. In an embodiment, at least 7 carbon atoms are disposed between the ester linkages and the first alkenyl group in one or more of the fatty chains, and the fatty chains of the triglyceride each have at least 14 carbon atoms contained therein, such as from about 14 to about 22 carbon atoms. Examples of suitable triglycerides include, but are not limited to, the reaction product of glycerol and any of the aforementioned free fatty acids.

The at least one unsaturated compound may be included in a source of unsaturated compounds, such as a vegetable or animal oil, and the vegetable and/or animal oil may be directly included in the unsaturated feed 12 as the only component thereof, or may be included in the unsaturated feed 12 along with additional unsaturated compounds, hydrocarbons, and/or other compounds from other sources. As known in the art, vegetable and animal oils contain a combination of fatty acids and/or triglycerides. Suitable vegetable and animal oils include, but are not limited to, soybean oil, corn oil, safflower oil, canola oil, sesame oil, sunflower seed oil, palm oil, and combinations thereof As one specific example, soybean oil primarily contains linoleic acid, linolenic acid, oleic acid, and triglycerides including the same, with the aforementioned fatty acids and triglycerides generally present in the soybean oil in an amount of from about 80 to about 100 weight % based on the total weight of the soybean oil. Using the vegetable and animal oils that are set forth above sufficient amounts of normal paraffins that are below the diesel boiling range may be obtained, after epoxidation, conversion to secondary hydroxyl groups, and deoxygenation, to avoid the severe cracking conditions that may produce excessive amounts of low-octane naphtha while still enabling appreciable amounts of C9 to C15 normal paraffins to be obtained.

In an embodiment, the unsaturated feed 12 includes a total amount of unsaturated compounds that have at least one alkenyl group, such as those that are described in detail above, in an amount of at least 0.5, such as from about 30 to about 100, or such as from about 30 to about 70, weight % based on the total weight of the unsaturated feed 12. The balance of the unsaturated feed 12 may include, for example, saturated compounds that do not undergo epoxidation.

As alluded to above, the unsaturated feed 12 is epoxidized, such as in the epoxidation stage 14 of the apparatus 10 shown in FIG. 1. The epoxidation stage 14 is adapted to receive the unsaturated feed 12, and may be further adapted to receive additional reactants to facilitate epoxidation of the unsaturated feed 12. Epoxidation of the unsaturated feed 12 converts the at least one alkenyl group in the unsaturated compound to an epoxide functional group, thereby converting the unsaturated compound to an epoxide compound having at least one epoxide functional group. An epoxidized stream 16 is produced by the epoxidation stage 14, with the epoxidized stream 16 including the epoxide compound along with other optional compounds that are present in the unsaturated feed 12 and that remain unreacted after epoxidation. It is to be appreciated that, through control of reaction conditions, stoichiometry, reactants, and type of unsaturated compound in the unsaturated feed 12, one or more alkenyl groups may be epoxidized. In an embodiment, only a portion of all alkenyl groups contained in the unsaturated compound are epoxidized, with one or more unreacted alkenyl groups remaining in the epoxide compound after epoxidation. In another embodiment, all alkenyl groups present in the unsaturated compound are epoxides, with the epoxide compound effectively free from unreacted alkenyl groups but for residual amounts that are below detectable limits using standard spectroscopy instruments.

In an embodiment, the at least one alkenyl group in the unsaturated compound is epoxidized through olefinic peroxidation, optionally in the presence of a catalyst. Olefinic peroxidation is known in the art, and various mechanisms are known for conducting olefinic peroxidation. In an embodiment, to conduct olefinic peroxidation, the unsaturated compound is reacted with an oxidant 18 chosen from peroxides, peracids, or inorganic oxidants such as sodium hypochlorite or sodium percarbonate. In an embodiment, olefinic peroxidation is conducted using a peracid as the oxidant 18. Examples of suitable peracids include, but are not limited to, those having the general formula:

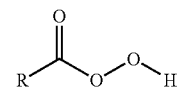

where R is an aromatic or aliphatic group. One example of a suitable peracid is meta-chloroperoxybenzoic acid (mCPBA). It is to be appreciated that peracids can be used that don't contain carbonyl functionality such as, for example, tert-butyl hydroperoxide (TBHP). The amount of the oxidant 18 employed may be varied depending upon a theoretical number of alkenyl groups with the unsaturated compound to establish a stoichiometric excess of the oxidant 18 to alkenyl groups that are to be epoxidized. Under some circumstances, an initiator such as a transition metal may be employed to initiate olefinic peroxidation. General conditions for conducting olefinic peroxidation are known in the art. In another embodiment, the at least one alkenyl group in the unsaturated compound is epoxidized by ozonizing the at least one alkenyl group. Ozonation may be conducted, for example, by oxidation of the unsaturated compound in a homogeneous gas phase reaction by using a gas flow of ozone/$NO_x$ as an oxidant, which converts the at least one alkenyl group to epoxide functionality. Ozonation generally does not require a catalyst. Specific conditions for ozonizing unsaturated compounds are known by those of skill in the art.

In an embodiment, the unsaturated compound is soybean oil, which can be epoxidized to form an epoxide compound with an epoxide functional group at a location in at least one of the fatty chains thereof that is analogous to a location of a hydroxyl group in fatty chains of ricinoleic acid (and subsequent ring-opening of the epoxide functional group results in formation of a hydroxyl group to effectively replicate the structure of one fatty chain in the ricinoleic acid). However, it is to be appreciated that epoxidation of the unsaturated compound is not limited to any particular unsaturated feed 12, so long as the unsaturated feed 12 has at least some unsaturated compound present therein that has the aforementioned characteristics.

After epoxidation, the at least one epoxide functional group in the epoxide compound is converted to at least one secondary hydroxyl functional group. In particular, the epoxide compound is converted to a hydroxyl-functional compound having at least one hydroxyl functional group. In an embodiment, conversion of the at least one epoxide functional group to at least one secondary hydroxyl functional group is conducted through a nucleophilic ring-opening reaction. For example, in an embodiment and as shown in FIG. 1, the apparatus 10 includes a ring-opening stage 20 that is in fluid communication with the epoxidation stage 14 for receiving the epoxide compound, more particularly the epoxidized stream 16 that contains the epoxide compound. A conversion stream 22 is produced by the ring-opening stage 20, with the conversion stream 22 including the hydroxyl-functional compound as well as unreacted compounds that are present in the unsaturated feed 12. The ring-opening stage 20 converts the at least one epoxide functional group in the epoxide compound to at least one secondary hydroxyl functional group by facilitating the nucleophilic ring-opening reaction. Nucleophilic ring-opening reactions are generally known in the art, and various mechanisms are known for conducting the reaction using various reactants and conditions that are effective to open the ring. Nucleophilic ring-opening reactions generally involve reaction of the epoxide functional group with a nucleophile under either acidic or basic conditions, with the nucleophile, acid, or base combined with the epoxidized stream 16 either before or within the ring-opening stage 20. In an embodiment, the nucleophilic ring-opening reaction is conducted by reacting the at least one epoxide functional group with water under acidic conditions, which thereby produces two secondary hydroxyl functional groups for each epoxide functional group that is reacted with a secondary hydroxyl group bonded to respective carbon atoms in the fatty chain that were contained in the reacted epoxide functional group. In another embodiment, the nucleophilic ring-opening reaction is conducted by reacting the at least one epoxide functional group with hydrogen, which produces a single secondary hydroxyl group bonded to a carbon atom in the fatty chain. Water and hydrogen are particularly suitable nucleophiles that can be used in the nucleophilic ring-opening reaction because water and hydrogen are readily available in many industrial-scale refinery schemes where the methods as described herein are likely to be conducted. As shown in FIG. 1, a supplement stream 24 including the nucleophile, acid, and/or base that are used to facilitate the ring-opening reaction are mixed with the epoxidized stream 16 within the ring-opening stage 20. However, it is to be appreciated that the supplement stream 24 can be mixed with the epoxidized stream 16 at any point after the epoxidation stage 14, including prior to the ring-opening stage 20. General conditions for conducting ring-opening reactions are known in the art.

After converting the at least one epoxide functional group in the epoxide compound to at least one secondary hydroxyl functional group, the hydroxyl-functional compound is deoxygenated to form normal paraffins. In an embodiment, deoxygenating the at least one epoxide functional group is conducted in the absence of intervening unit operations between conversion of the at least one epoxide function group to the at least one secondary hydroxyl group, i.e., the conversion stream 22 including the hydroxyl-functional compound is deoxygenated directly after converting the at least one epoxide functional group in the epoxide compound to at least one secondary hydroxyl functional group. In an embodiment and as shown in FIG. 1, the apparatus 10 includes a deoxygenation stage 26 that is in fluid communication with the ring-opening stage 20 for receiving the hydroxyl-functional compound, more particularly the conversion stream 22 that includes the hydroxyl-functional compound, from the ring-opening stage 20 and for deoxygenating the hydroxyl-functional compound to form the normal paraffins. The normal paraffins are included in a deoxygenated stream 28 that is produced by the deoxygenation stage 26.

Deoxygenation of unsaturated streams that includes free fatty acids or their derivatives, such as triglycerides, is a process known to those of skill in the art. In particular, deoxygenating the hydroxyl-functional compound includes reacting the conversion stream 22 with hydrogen at elevated temperatures and pressures, for a specified period of time, in the presence of a deoxygenation catalyst to form normal paraffins. As referred to herein, deoxygenation refers to a unit operation by which oxygen is removed from compounds in the conversion stream 22 through any mechanism including, but not limited to, decarboxylation, decarbonylation, and/or hydrodeoxygenation. In an embodiment and as shown in FIG. 1, hydrogen 30 is mixed with the conversion stream 22 prior to introduction into the deoxygenation stage 26. However, it is to be appreciated that the hydrogen 30 can be mixed with the conversion stream 22 at any point after the ring-opening stage 20, including within the deoxygenation stage 26. Also, the hydrogen 30 can be obtained from any source, and in an embodiment can be provided from a recycle hydrogen stream 32 that is recovered in a downstream separation stage 34. Suitable deoxygenation catalysts include any of those well known in the art such as nickel or nickel/molybdenum dispersed on a support. Other deoxygenation catalysts include one or more noble metal catalytic elements dispersed on a support. Non-limiting examples of noble metals include platinum and/or palladium dispersed on a gamma-alumina support.

In an embodiment, the hydroxyl-functional compound is deoxygenated to form the deoxygenated stream 28 that includes normal paraffins that have from 9 to 15 carbon atoms, such as from about 10 to about 13 carbon atoms, depending upon desired applications for the deoxygenated stream 28. It is to be appreciated that deoxygenation of the hydroxyl-functional compound may not entirely result in paraffins that have from 9 to 15 carbon atoms and that paraffins of the base fatty acid on which the epoxide is formed may also be present. For example, if a C18 fatty acid is epoxidized followed by deoxygenation, some C18 and C17 paraffins may still be obtained, along with some paraffins of shorter length where the C18 chain is broken proximal to a hydroxyl group that results from the epoxidation and ring opening. In an embodiment, the hydroxyl-functional compound, and more particularly the conversion stream 22, is deoxygenated in the presence of hydrogen 30 at a pressure of from about 1379 to about 7000 kPa, such as from about 1379 to about 4481 kPa, or such as from about 1379 to about 4137 kPa, and a temperature of from about 200 to about 450° C. in the presence of hydrogen 30 and the deoxygenation catalyst. In an embodiment, the hydroxyl-functional compound, more particularly the conversion stream 22, is deoxygenated at a liquid hourly space velocity of the conversion stream 22 of from about 0.1 to about 4 hr$^{-1}$. Without being bound to any particular theory, it is believed that deoxygenating the conversion stream as described above also results in breakage of carbon-carbon double bonds within the hydroxyl-functional compound, with the resulting normal paraffins being substantially free of carbon-carbon double bonds. Also without being bound to any particular theory, it is believed that deoxygenating the conversion stream as described above also results in cleavage of the hydroxyl-functional compound at the carbonyl group to produce the normal paraffins.

In an embodiment and as shown in FIG. 1, the deoxygenated stream 28 is passed from the deoxygenation stage 26 to the separation stage 34 for separating unreacted hydrogen, carbon oxides, and water from the deoxygenated stream 28, thereby leaving C9 to C15 normal paraffins and, optionally, other normal paraffins having greater than 16 carbon atoms, and trace amounts of other hydrocarbons in the deoxygenated stream 28. It is to be appreciated that the specific content of the deoxygenated stream 28 is dependent upon the content of the unsaturated feed 12. The unreacted hydrogen 32 may be separated from the deoxygenated stream 28 independent of the carbon oxides and water 36, and may be recycled to the deoxygenation stage 26, as alluded to above. Alternatively, the amount of hydrogen 30 fed to the deoxygenation stage 26 may be in only slight excess, e.g., from about 5 to about 25% of the hydrogen requirements for the deoxygenation reactions and therefore not recycled but rather separated from the deoxygenated stream 28 along with the carbon oxides and water 36.

In an embodiment, the deoxygenated stream 28 includes C9 to C15 normal paraffins in an amount of at least 0.5 weight %, such as from about 5 to about 30 weight %, based on the total weight of the deoxygenated stream 28 after optional removal of hydrogen, carbon oxides, and water therefrom. In a further embodiment, the deoxygenated stream 28 includes C10 to C13 normal paraffins in an amount of at least 0.5 weight %, such as from about 5 to about 30 weight %, based on the total weight of the deoxygenated stream 28 after optional removal of hydrogen, carbon oxides, and water therefrom. It is to be appreciated that the balance of the deoxygenated stream 28 includes other normal paraffins having greater than 16 carbon atoms, isomerized paraffins, and/or trace amounts of other hydrocarbons. Such yields of the C9 to C15 normal paraffins, or C10 to C13 normal paraffins, are made possible through the epoxidation and ring-opening reactions conducted in the manner set forth above with the unsaturated feed 12 that contains the particular free fatty acids and/or triglycerides as described above.

The normal paraffins, and particularly the deoxygenated stream 28 after optional separation of hydrogen, carbon oxides, and water therefrom, have various commercial and industrial uses. It is to be appreciated that the methods described herein are not limited to any particular end use of the normal paraffins. In an embodiment, the normal paraffins are provided as a product stream, or may be separated into various product streams through conventional separation methods such as through fractionation and/or adsorption (although FIG. 1 does not show such further processing stages).

In another embodiment, although not shown in FIG. 1, the deoxygenated stream 28 including the normal paraffins is isomerized to enhance cold flow and freeze point properties, thereby rendering the deoxygenated stream 28 more useful in fuel applications. In another embodiment, also not shown in FIG. 1, cracking can be conducted to crack normal paraffins that have higher carbon chain lengths into paraffins that have lower carbon chain lengths, such as C9 to C15 normal paraffins. It is to be appreciated that a portion of the deoxygenated stream 28 may be isomerized and/or cracked, or the entire deoxygenated stream 28 may be isomerized and/or cracked. While cracking has traditionally been used to crack normal paraffins that have higher carbon chain lengths into paraffins that have lower carbon chain lengths, such as C9 to C15 normal paraffins, the deoxygenated stream 28 that is prepared in accordance with the methods described herein already has a sufficiently high content of C9 to C15 normal paraffins to avoid severe cracking conditions that may otherwise be required to effectively yield C9 to C15 paraffins with the unsaturated feed 12 described above (i.e., in the absence of epoxidation and conversion to secondary hydroxyl functional groups).

Conditions for isomerization and fractionation of normal paraffins are known in the art. In an embodiment, the deoxygenated stream 28 is isomerized in the presence of an isomerization catalyst and further in the presence of hydrogen at isomerization and selective hydrocracking conditions to form an isomerized stream. Due to the presence of hydrogen, the reactions may be called hydroisomerization and hydrocracking. Suitable isomerization catalysts include, but are not limited to, a metal of Group VIII (IUPAC 8-10) of the Periodic Table and a support material. Suitable Group VIII metals include platinum and palladium, each of which may be used alone or in combination. The support material may be amorphous or crystalline. Suitable support materials include aluminas, amorphous alumina, amorphous silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. Normal paraffins remain in the isomerized stream, and the isomerized stream includes normal paraffins and isomerized paraffins. In an embodiment, the isomerized stream is fractionated to provide a renewable jet fuel stream.

In an embodiment, the deoxygenated stream 28 is isomerized at a temperature of from about 150° C. to about 360° C., such as from about 300° C. to about 360° C., and a pressure of from about 1034 kPa to about 4726 kPa, such as from about 1034 kPa to about 2068 kPa. Other operating conditions for the isomerization zone are known in the art. Conventional isomerization often requires more severe conditions, such as pressures in excess of 4826 kPa, to effectively crack normal paraffins having greater than 15 carbon atoms to yield C9 to C15 paraffins, but a high content of undesirable byproducts also results from the more severe conditions.

In another embodiment, the normal paraffins, more particularly the deoxygenated stream 28 after optional separation of hydrogen, carbon oxides, and water, is provided along with a reactant compound to a synthesis process to produce a hydrocarbon product stream that includes a product that is derived from the normal paraffins and the reactant compound (not shown in FIG. 1). The reactant compound is not particularly limited and can be any compound or combination of compounds known in the art for reacting with normal paraffins. For example, in an embodiment the normal paraffins are employed in linear alkylbenzene synthesis. In this embodiment, the reactant compound is benzene. The normal paraffins are dehydrogenated to produce mono-olefins, followed by reacting the benzene and the mono-olefins to produce linear alkylbenzene. Conditions for facilitating production of linear alkylbenzene are known in the art.

EXAMPLE

A reference example was prepared to illustrate production of normal paraffins from the deoxygenation of castor oil. In particular, the castor oil was deoxygenated in the presence of hydrogen over a deoxygenation catalyst bed including NiMo-impregnated type II hydrotreating catalyst at a temperature of about 310° C., a pressure of about 3447.4 kPa, and at a liquid hourly space velocity of about 1.0 $hr^{-1}$.H2:HC=4000 scf/B A yield profile of normal paraffins was obtained including C10 normal paraffins in an amount of about 7.5 weight %, C11 normal paraffins in an amount of about 10.0 weight %, C17 normal paraffins in an amount of about 29.0 weight %, and C18 normal paraffins in an amount of about 33.0 weight %.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of preparing normal paraffins, the method comprising:
   providing an unsaturated feed comprising an unsaturated compound having at least one carbonyl functional group and at least one alkenyl group;
   epoxidizing the unsaturated feed to convert the at least one alkenyl group in the unsaturated compound to an epoxide functional group, thereby converting the unsaturated compound to an epoxide compound having at least one carbonyl functional group and at least one epoxide functional group;
   converting the at least one epoxide functional group in the epoxide compound to at least one secondary hydroxyl functional group, thereby converting the epoxide compound to a hydroxyl-functional compound having at least one carbonyl functional group and at least one hydroxyl functional group;
   deoxygenating the hydroxyl-functional compound to form normal paraffins.

2. The method of claim 1, wherein the unsaturated compound is further defined as a free fatty acid having at least one fatty chain, and wherein providing the unsaturated feed comprises providing the unsaturated feed comprising the free fatty acid.

3. The method of claim 2, wherein the at least one fatty chain comprises a single alkenyl group, and wherein providing the unsaturated feed comprises providing the unsaturated feed comprising the free fatty acid wherein the at least one fatty chain comprises a single alkenyl group.

4. The method of claim 1, wherein the unsaturated compound is further defined as a triglyceride having three fatty chains and wherein providing the unsaturated feed comprises providing the unsaturated feed comprising the triglyceride.

5. The method of claim 4, wherein the fatty chains each comprise a single alkenyl group, and wherein providing the unsaturated feed comprises providing the unsaturated feed comprising the triglyceride having three fatty chains each comprising a single alkenyl group.

6. The method of claim 1, wherein epoxidizing the unsaturated feed comprises olefinically peroxidizing the at least one alkenyl group in the unsaturated compound, optionally in the presence of a catalyst.

7. The method of claim 6, wherein olefinically peroxidizing the at least one alkenyl group comprises peroxidizing the at least one alkenyl group with a peracid.

8. The method of claim 1, wherein epoxidizing the unsaturated feed comprises ozonizing the at least one alkenyl group in the unsaturated compound.

9. The method of claim 1, wherein converting the at least one epoxide functional group to the at least one secondary hydroxyl functional group comprises conducting a nucleophilic ring-opening reaction to convert the at least one epoxide functional group to the at least one secondary hydroxyl functional group.

10. The method of claim 9, wherein conducting the nucleophilic ring-opening reaction comprises reacting the at least one epoxide functional group with water under acidic conditions.

11. The method of claim 1, wherein deoxygenating the hydroxyl-functional compound comprises deoxygenating the hydroxyl-functional compound at a pressure of from about 1379 to about 7000 kPa and a temperature of from about 200 to about 450° C. in the presence of hydrogen and a deoxygenation catalyst.

12. The method of claim 1, wherein deoxygenating the hydroxyl-functional compound comprises deoxygenating the hydroxyl-functional compound to form a deoxygenated stream comprising the normal paraffins having from 9 to 15 carbon atoms.

13. The method of claim 12, further comprising isomerizing the deoxygenated stream comprising the normal paraffins in the presence of an isomerization catalyst to form an isomerized stream comprising the normal paraffins and isomerized paraffins.

14. The method of claim 13, wherein isomerizing the deoxygenated stream comprises isomerizing the deoxygenated stream at a temperature of from about 150° C. to about 360° C., such as from about 300° C. to about 360° C., and a pressure of from about 1034 kPa to about 4726 kPa.

15. The method of claim 1, wherein deoxygenating the hydroxyl-functional compound is conducted after converting the epoxide compound to the hydroxyl-functional compound in the absence of intervening unit operations.

16. A method of preparing a hydrocarbon product stream, the method comprising:
   providing an unsaturated feed comprising an unsaturated compound having at least one carbonyl functional group and at least one alkenyl group;
   epoxidizing the unsaturated feed to convert the at least one alkenyl group in the unsaturated compound to an epoxide functional group, thereby converting the unsaturated compound to an epoxide compound having at least one carbonyl functional group and at least one epoxide functional group;
   converting the at least one epoxide functional group in the epoxide compound to at least one secondary hydroxyl functional group, thereby converting the epoxide compound to a hydroxyl-functional compound having at least one carbonyl functional group and at least one hydroxyl functional group;

deoxygenating the hydroxyl-functional compound to form normal paraffins; and providing the normal paraffins and a reactant compound to a synthesis process to produce the hydrocarbon product stream comprising a product derived from the normal paraffins and the reactant compound.

17. The method of claim 16, wherein providing the normal paraffins and the reactant compound to the synthesis process comprises dehydrogenating the normal paraffins after deoxygenating the hydroxyl-functional compound to produce mono-olefins.

18. The method of claim 17, wherein the reactant compound is benzene, and wherein providing the normal paraffins and the reactant compound to the synthesis process comprises alkylating the benzene with the mono-olefins to produce linear alkylbenzene.

* * * * *